United States Patent
Dieckröger

(12)
(10) Patent No.: US 6,671,439 B2
(45) Date of Patent: Dec. 30, 2003

(54) INTEGRATED WAVEGUIDE ARRANGEMENT, PROCESS FOR PRODUCING AN INTEGRATED WAVEGUIDE ARRANGEMENT, AND WAVEGUIDE COMPONENTS

(75) Inventor: Jens Dieckröger, München (DE)

(73) Assignee: Infineon Technologies AG, Munich (DE)

(*) Notice: Subject to any disclaimer, the term of this patent is extended or adjusted under 35 U.S.C. 154(b) by 143 days.

(21) Appl. No.: 09/899,493

(22) Filed: Jul. 5, 2001

(65) Prior Publication Data
US 2002/0025120 A1 Feb. 28, 2002

(30) Foreign Application Priority Data
Jul. 6, 2000 (DE) .......................... 100 32 933

(51) Int. Cl.[7] ............... G02B 6/26; G02B 6/35
(52) U.S. Cl. .......................... 385/50; 385/140
(58) Field of Search ........................ 385/16, 50, 140

(56) References Cited

U.S. PATENT DOCUMENTS

| | | | |
|---|---|---|---|
| 5,396,363 A | 3/1995 | Valette | 359/248 |
| 6,002,823 A | 12/1999 | Chandross et al. | 385/50 |
| 6,282,335 B1 | 8/2001 | Lösch et al. | 385/16 |
| 2001/0031122 A1 * | 10/2001 | Lackritz et al | 385/131 |
| 2003/0048975 A1 * | 3/2003 | Lackritz et al. | 385/14 |

FOREIGN PATENT DOCUMENTS

| | | |
|---|---|---|
| EP | 0768554 A1 | 4/1997 |
| EP | 0 980 018 A2 | 2/2000 |
| EP | 0987580 A1 | 3/2000 |
| EP | 0 992 834 A2 | 4/2000 |
| EP | 0 994 370 A2 | 4/2000 |
| EP | 1 018 665 A1 | 7/2000 |
| JP | 10090636 A | 4/1998 |
| JP | 11237652 | 8/1999 |
| WO | WO 01/55780 A2 | 8/2001 |

OTHER PUBLICATIONS

Moosburger et al., "Digital optical switch based on 'oversized' polymer rib waveguides," Electronic Letters, p. 544–545, (Mar. 14, 1996).

Keil et al., "4×4 polymer thermo-optic directional coupler switch at 1.55um," Electronics Letters, p. 639–640, (Apr. 14, 1994).

* cited by examiner

*Primary Examiner*—Michael C. Zarroli
(74) *Attorney, Agent, or Firm*—Jenkins, Wilson & Taylor, P.A.

(57) ABSTRACT

The invention explains, inter alia, integrated waveguide arrangements in which a waveguide with glass core and glass sheath is arranged in a waveguide layer consisting of glass. A foreign region made from a material other than glass extends in the vicinity of the waveguide. A temperature-adjustment unit is used to heat and/or cool the foreign region. The foreign region is integrated in the waveguide region.

18 Claims, 10 Drawing Sheets

Refractive Index Distribution:
$n_1 = 1.442$ SiO$_2$
$n_2 = 1.5$ Polymer z.B.: Cyclotene
$n_3 = 1.448$ SiO$_2$ Refractive Index Distribution:
$n_1 = 1.442$ SiO$_2$
$n_2 = 1.5$ Polymer z.B.: Cyclotene
$n_3 = 1.448$ SiO$_2$ Polymer region
not heated:
  Ia: n2>n3
      T1a Optimum wave guidance:
Polymer region
heated to:
  IIa: n2=n3
      T2a>T1a Attenuation:
Polymer region
heated to:
  IIIa: n2<n3
      T3a>T2a Refractive index distribution:
$n_1 = 1.447$ SiO$_2$
$n_2 = 1.5$ Polymer, e.g.: Cyclotene
$n_3 = 1.45$ SiO$_2$

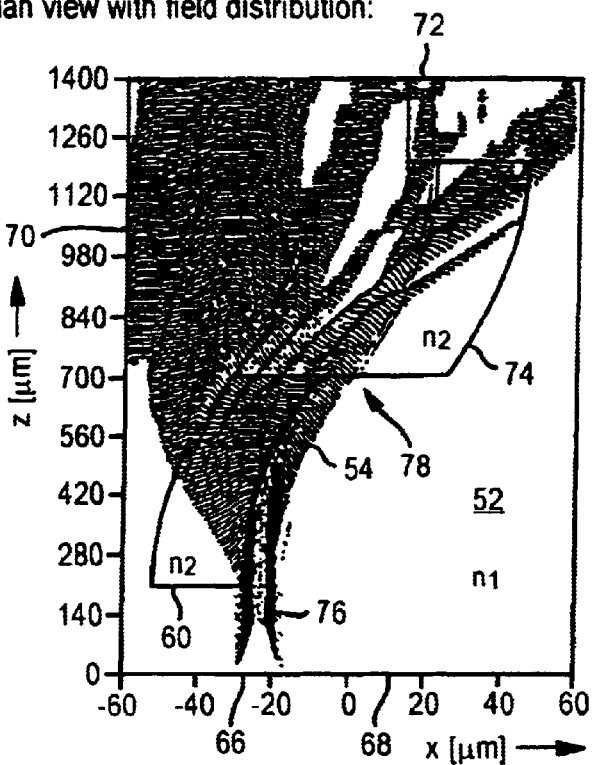
FIG. 4A Plan view with field distribution:
Switched-off state:
Ib: $n_3 \leq n_1 < n_2$
T1b
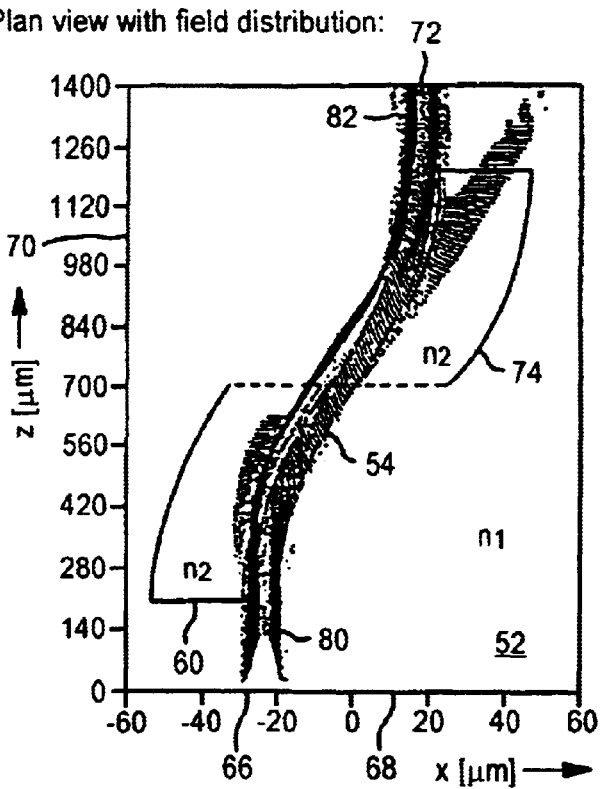
FIG. 4B Plan view with field distribution:
Switched-on state:
IIb: $n_2 \leq n_1 < n_3$
T2b>T1b Refractive Index Distribution:
$n_1 = 1.442$ SiO$_2$
$n_2 = 1.5$ Polymer
$n_3 = 1.448$ SiO$_2$ Ic: Polymer region heated: $n_2 \leq n_1$, T1c IIc: Polymer region not heated: $n_2 \geq n_3$, T2c<T1c Refractive index distribution:
$n_1 = 1.442$ SiO$_2$
$n_2 = 1.5$ Polymer, e.g.: Cyclotene
$n_3 = 1.448$ SiO$_2$ Id: Polymer is heated => $n_1 = n_2 < n_3$, T1d IId: Polymer is heated to a lesser extent to $n_1 < n_2 = n_3$, T2d < T1d Refractive index distribution:
$n_1 = 1.442$ SiO₂
$n_2 = 1.5$ Polymer, e.g.: Cyclotene
$n_3 = 1.448$ SiO₂

IIId: Heater switched off:
$n_1 < n_3 < n_2$, T3d<T2d

Refractive index distribution:
$n_1 = 1.442$ SiO$_2$
$n_2 = 1.5$ Polymer, e.g.: Cyclotene
$n_3 = 1.448$ SiO$_2$ Ie: $n_1 = n_2 < n_3$, T1e IIe: $n_1 < n_2 = n_3$, T2e < T1e Refractive index distribution:
$n_1 = 1.442$ SiO2
$n_2 = 1.5$ Polymer, e.g.: Cyclotene
$n_3 = 1.448$ SiO2

IIIe: $n_1 < n_3 < n_2$, $T3e < T2e$

INTEGRATED WAVEGUIDE ARRANGEMENT, PROCESS FOR PRODUCING AN INTEGRATED WAVEGUIDE ARRANGEMENT, AND WAVEGUIDE COMPONENTS

TECHNICAL FIELD

The invention relates to an integrated waveguide arrangement which includes a waveguide region, a foreign region and a temperature-adjustment unit.

BACKGROUND ART

Typically, the waveguide region consists of glass, for example $SiO_2$, and includes a waveguide with glass core and glass sheath. The refractive index of the glass cores is greater than the refractive index of the glass sheath. The waveguide is such that it carries an electromagnetic wave with low losses. The foreign region consists of a material other than glass and extends in the vicinity of the waveguide. A typical distance between foreign region and waveguide is, for example, 1 micrometer ($\mu$m) or 2 $\mu$m.

The temperature-adjustment unit is used to heat and/or cool the foreign region, so that it is possible to influence the wave propagation in the waveguide. A typical working range of the temperature-adjustment unit is between −40° C. and 150° C.

A waveguide arrangement of this type is known form the article "Hybrid switches offer the best of both worlds", fiber systems, 05/2000, Vol.4, No.4, p.15, by Pauline Rigby. The wave arrangement explained in that document includes two waveguides made from glass which are connected by a waveguide made from polymer.

When producing waveguides from glass, the procedure is usually as follows:
1. An intermediate layer of silicon dioxide, which is known as a buffer layer, is applied to a silicon substrate.
2. A core layer, the refractive index of which is greater than the refractive index of the silicon dioxide layer, is applied to the silicon dioxide layer. The core layer likewise consists of silicon dioxide.
3. Regions at which there are to be no waveguide cores are removed from the core layer, usually by dry-chemical etching.
4. The remaining waveguide cores of the core layer and those areas of the intermediate layer which have been exposed in the previous process step are coated with a sheath coating of silicon dioxide which has the same refractive index as the silicon dioxide of the intermediate layer. This process is also known as cladding.

The known integrated waveguide arrangement is hybrid in the sense that it includes a waveguide made from glass and a waveguide made from polymer. Waveguides made from glass are distinguished by low transmission losses when carrying the waves. By contrast, waveguides made from polymer have a significantly higher thermo-optical coefficient than waveguides made from glass and are therefore more suitable for switching operations with the aid of the temperature-adjustment unit. The thermo-optical coefficient is a measure of the change in the refractive index as a function of the change in temperature of a material. For $SiO_2$, the thermo-optical coefficient is approximately dn/dT=1e−6/K. On account of using both materials, the hybrid approach exploits both advantages. The result is a switching element which operates with a low switching power and low transmission losses.

SUMMARY OF THE INVENTION

It is an object of the invention to provide an integrated waveguide arrangement which is of simple structure and in which the advantages of the hybrid structure are retained. Moreover, it is intended to provide a process for producing a waveguide arrangement of this type.

The object relating to the waveguide arrangement is achieved by means of a waveguide arrangement having the features of patent claim 1. Refinements are given in the subclaims.

The invention is based on the discovery that the good properties of a polymer waveguide with regard to the high temperature coefficient are retained even if only the waveguide core consists of polymer. The waveguide sheath can be produced from glass without the transmission properties being changed significantly. Furthermore, the discovery is based on the consideration that materials other than glass, for example polymer, have a better capacity to conduct heat. When using a waveguide core made from a material other than glass in a region consisting of glass, the energy emitted by the temperature-adjustment unit can be concentrated in a smaller area, since less heat is dissipated via the waveguide sheath.

In the waveguide arrangement according to the invention, in addition to the features listed in the introduction, the foreign region is integrated or embedded in the waveguide region. The foreign region forms the region in which switching operations take place with the aid of the temperature-adjustment unit. In the waveguide arrangement according to the invention, waveguides are made from glass apart from the foreign region and therefore have low transmission losses. The foreign region itself consists of a material other than glass, which therefore has a higher thermal conductivity and a greater thermo-optical coefficient.

The integration of the foreign region in the waveguide region facilitates production of the waveguide arrangement. In addition to the process steps listed in the introduction, the following steps are carried out:
5. A trench is etched into the sheath layer.
6. The entire structure is coated with a polymer, for example by means of spinning.

Therefore, during production of the waveguide arrangement according to the invention it is simply necessary to apply a polymer layer. The manufacturing tolerances are low, because a trench of defined depth can be etched with very great accuracy.

The advantages of the hybrid approach are retained in the waveguide arrangement according to the invention. In addition, however, the effect is achieved that the heat which is dissipated by the temperature-adjustment unit is concentrated on the waveguide core made from polymer, since a glass sheath is being used. Also, during cooling operations, heat is initially extracted only from the foreign region. This leads to a reduction in the switching power required.

The refractive index of the material in the foreign region is not critical, since the high thermo-optical coefficient means that it can be set within wide limits with the aid of the temperature-adjustment unit.

The integrated waveguide arrangement according to the invention opens up the route to a large number of new types of waveguide components. Depending on the arrangement of the foreign region with regard to a glass waveguide or with regard to a plurality of glass waveguides, it is possible, inter alia, to construct switching units, coupling units, attenuators and radiators.

In a refinement of the waveguide arrangement according to the invention, the waveguide region is arranged on a planar substrate. On the side which is remote from the substrate, the waveguide region forms a surface which lies approximately parallel to the interface between substrate and waveguide region. The waveguide arrangement can be produced using the technically highly developed lithographic processes. When using the process steps 1 to 4 listed in the introduction, therefore, the waveguide region includes the intermediate layer, parts of the core layer, specifically the waveguide cores made from glass and the sheath covering. On account of flow processes during its application to the side remote from the substrate, the sheath covering has a surface which is approximately parallel to the substrate surface.

In a subsequent refinement, the foreign region is produced from a material with a thermo-optical coefficient, the magnitude of which differs significantly from the magnitude of the thermo-optical coefficient of the glass. By way of example, coefficients which in terms of magnitude are 100 times greater than the thermo-optical coefficient of glass are used. The reference temperature selected, by way of example, is room temperature, i.e. 20° C.

In a further configuration, the material used in the foreign region is a plastic, for example, a polymer. An example of a polymer with a positive thermo-optical coefficient is a fluoroacrylate polymer which contains pentafluorostyrene (PFS), trifluoroethylmethacrylate (TFM) and glycidylmethacrylate (GMA). An example of a polymer with a negative thermo-optical coefficient is benzocyclobutene resin (RCB), which is marketed by the Dow Chemical Company under the CYCLOTENE trademark. This is a polymer which is polymerized from divinyldisiloxane-bis-benzocyclobutene monomers (B stage). The choice of polymer depends on what is required at the "normal" switching state. A polymer with a thermo-optical coefficient which overall requires a lower heating capacity is selected.

In one configuration, the foreign region extends from that surface of the waveguide region which is remote from the substrate to close to the waveguide. This arrangement is a result of the production technology employed. It is possible to introduce a trench from that surface of the waveguide region which is remote from the substrate. When the material of the foreign region is then introduced into the trench, it extends as far as the edge of the trench or beyond it.

In another configuration, the waveguide core has a higher refractive index than the waveguide sheath, and the refractive index of the material in the foreign region is dependent on the temperature which is generated by the temperature-adjustment unit and, for the same waveguide arrangement, may, depending on the operating mode, be less than, equal to or greater than the refractive index of the waveguide sheath. This method of selecting refractive indices makes it possible to construct waveguide arrangements for different tasks. Examples of different components and the refractive indices required therefore are given below.

In a refinement, a damping component which operates thermo-optically is formed as a result of the foreign region extending into the waveguide core. Depending on the temperature in the foreign region, a wave is transmitted from that part of the waveguide made from glass which lies on one side of the foreign region, through the foreign region, into that part of the waveguide made from glass which lies on the other side of the foreign region. If the foreign region is at a temperature which leads to a refractive index which corresponds to the refractive index of the waveguide core made from glass, a wave is passed unchanged through the foreign region. By contrast, if the foreign region is at a temperature which leads to a refractive index which is lower than the refractive index of the glass material surrounding the foreign region, a wave cannot pass through the foreign region and is radiated into the waveguide sheath and the surrounding waveguide region. In this case, only a wave which has been attenuated to a greater or lesser extent is present in the waveguide core on the other side of the foreign region. This component is suitable for signal matching, for example upstream of a sensor element.

In other refinements, the foreign region extends approximately parallel to the glass waveguide. Since waveguide and foreign region are arranged so close together that a wave which is propagating in the waveguide is influenced, the extent of this influence is dependent both on the length of the distance over which foreign region and waveguide lie approximately parallel to one another and on the refractive index in the foreign region which is brought about by the temperature. Numerous control options and switching principles are opened up.

In a further configuration, the foreign region is arranged outside a region which lies between the glass waveguide and a substrate. When using lithographic processes to etch the trench for the foreign region, this measure does not entail any risk of the waveguide region being involuntarily destroyed, as would be the case if the trench had to be etched directly via the waveguide. In this case, the waveguide would be arranged within the region which lies between foreign region and substrate. An offset arrangement of the foreign region allows greater tolerances to be set when etching the trench.

A thermo-optical attenuator which operates according to a different principle is formed if the waveguide is curved along the direction of propagation of the waves. The foreign region is arranged at the curved regions of the waveguide. Depending on the temperature of the temperature-adjustment unit, a wave which is propagating within the glass waveguide will be drawn to a greater or lesser extent into the foreign region, from where it will be radiated into the waveguide sheath.

If, in a further configuration, glass waveguide and foreign region are of approximately the same cross section, they are suitable as waveguides for carrying the same type of wave. A wave can be transferred with relatively low transmission losses out of the glass waveguide into the foreign region or in the opposite direction. This forms the basis for numerous switching operations.

A thermo-optical reversing switch is formed in a waveguide arrangement in which the waveguide region includes two waveguides which run approximately parallel and between which the foreign region is arranged. The foreign region can be so small that, depending on the temperature, it transmits a wave transmitted in one waveguide into the other waveguide. With a small foreign region, the transmission losses in the polymer remain low. It is not necessary for the wave to be guided in the foreign region itself.

If, in a further configuration, an intermediate layer made from a material which prevents the optical field from reaching the temperature-adjustment unit is present between the temperature-adjustment unit and foreign region, waves can be transmitted with relatively low losses in the foreign region.

In an alternative configuration, however, the temperature-adjustment unit is arranged directly on the foreign region. As a result, the temperature-adjustment unit attenuates a wave which is propagating in the foreign region and therefore, in addition to emitting or absorbing heat, has a dual function. The absorption of a wave is for many applications better than diffuse radiation of the energy into the waveguide region. It is possible to construct an attenuator in which, on the one hand, the temperature-adjustment unit absorbs the wave which is propagating in the foreign region and in which, on the other hand, the material of the foreign region is selected in such a way that it has a poor transmission capacity. The drawback of the polymer, i.e. that it has higher transmission losses than a glass waveguide, can therefore be utilized as an advantage for an attenuator.

The invention also relates to a process for producing an integrated waveguide arrangement comprising the process steps given in patent claim 15. These process steps lead to the waveguide arrangement according to the invention. Therefore, the technical effects which have been listed above for the waveguide arrangement and for its configurations and refinements also apply to the process. In configurations of the process, it is modified in such a way that waveguide arrangements in accordance with the modifications referred to above are formed.

The invention relates furthermore to thermo-optical components, namely a thermo-optical radiation unit, a thermo-optical switching unit and a thermo-optical absorption unit in accordance with patent claims 16, 17 and 18, respectively. These components are closely technically related to the waveguide arrangement according to the invention and the process according to the invention.

The thermo-optical radiation unit is constructed in such a way that the foreign region interrupts the glass waveguide core. The foreign region is therefore introduced directly above the waveguide core and extends into this core or even closer to the substrate. Since the foreign region may be very small, it is possible to construct radiation units with short switching times.

The thermo-optical switching unit includes at least two waveguides which run parallel to one another at least in a section. The foreign region extends between the waveguides and lies parallel thereto. When this switching unit is being constructed, it is possible to select high manufacturing tolerances, since there is no risk of damage to the glass waveguide cores. The result is a compact thermo-optical switching unit which is simple to produce. The foreign region may be very small. This enables a switching unit with a short switching time to be produced.

In the thermo-optical absorption unit, the temperature-adjustment unit bears directly against the foreign region and absorbs a wave which is propagating in the foreign region. The temperature-adjustment unit therefore has a double function. The drawback of the material in the foreign region, namely that its transmission capacity is worse than that of glass, is in this case an advantage, since a high degree of attenuation is desired. Materials which have a high attenuation coefficient are selected for the foreign region. The thermo-optical component which is formed in this way can be used, for example, for level adapting ahead of sensor elements.

BRIEF DESCRIPTION OF THE DRAWINGS

In the text which follows, exemplary embodiments of the invention are explained with reference to the appended drawings, in which:

FIGS. 4A and 4B show the thermo-optical attenuator shown in FIG. 3 in two operating modes.

DETAILED DESCRIPTION OF THE INVENTION

Figure 1:
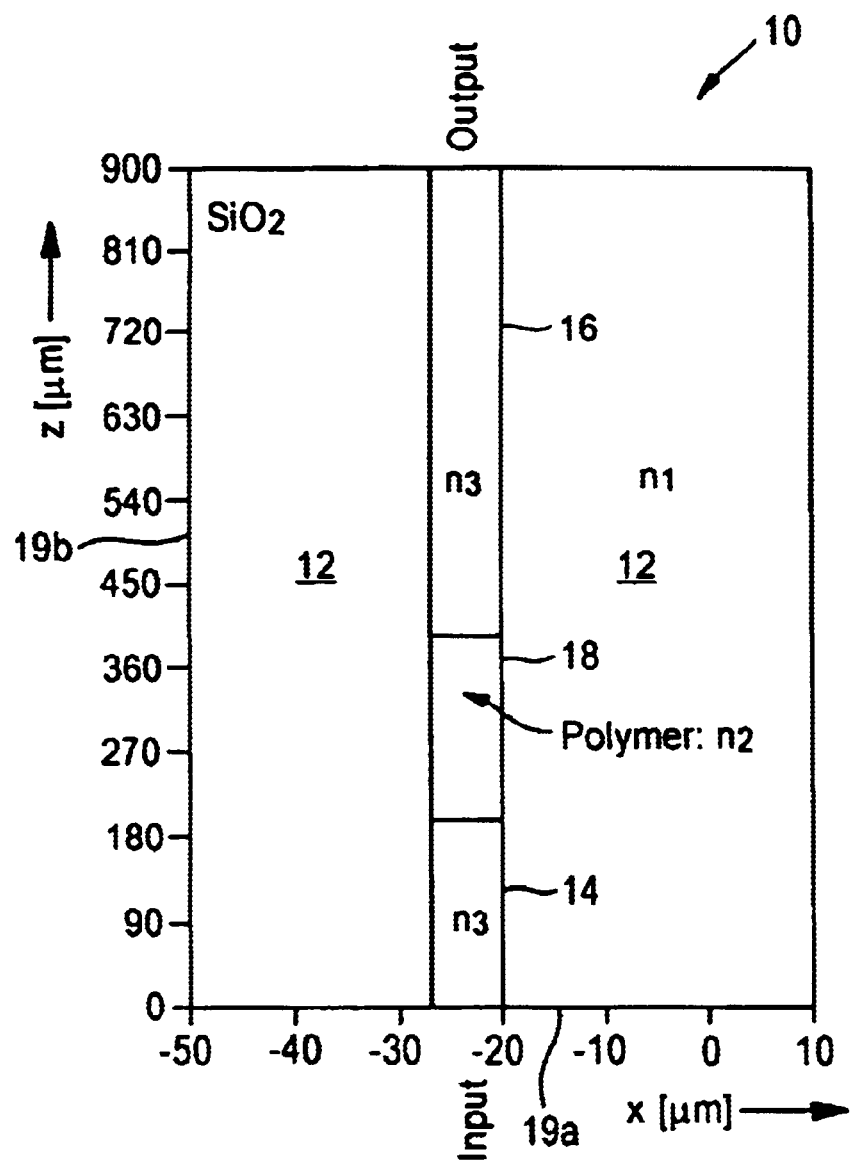
FIG. 1 shows a plan view of a thermo-optical attenuator.

FIG. 1 shows a plan view of a thermo-optical attenuator 10, which includes waveguide cores 14 and 16 which have been introduced into a waveguide layer 12. The waveguide layer 12 consists of silicon dioxide and has a refractive index $n1$ equal to 1.442. In the waveguide layer 12, the waveguide cores 14 and 16 are embedded on all sides. The waveguide cores 14 and 16 likewise consist of silicon dioxide, but have a refractive index $n3$ of 1.448. A polymer region 18 lies between the waveguide cores 14 and 16. The waveguide cores 14, 16 and the polymer region 18 are of the same dimension transversely with respect to the propagation direction of a wave in the waveguide cores 14, 16. The polymer region 18 extends from the surface of the waveguide layer 12 to the surfaces of the waveguide cores 14, 16 which face a substrate (not shown). At room temperature, the polymer region 18 has a refractive index $n2$ of 1.5. The refractive index $n2$ can be changed within wide ranges with the aid of a heater element (not shown) arranged above the polymer region 18, as explained below with reference to FIGS. 2A to 2C. The polymer region 18 consists of the CYCLOTENE™ material. The CYCLOTENE™ material has a very high negative temperature coefficient.

An abscissa axis 19a shows the length dimensions of the attenuator 10 in the x direction. An ordinate axis 19b shows length dimensions in the z direction. Therefore, the width of the waveguide core 14 is approximately 8 $\mu$m. The attenuator 10 is approximately 900 $\mu$m long.

The thermo-optical attenuator 10 attenuates a wave which is initially transmitted in the waveguide core 14 as a function of the temperature of the polymer region 18 or transmits this wave to the waveguide core 14. The waveguide core 14 is therefore an input and the waveguide core 16 an output. The precise way in which the thermo-optical attenuator functions is explained below with reference to FIGS. 2A to 2C.

Figure 2A:
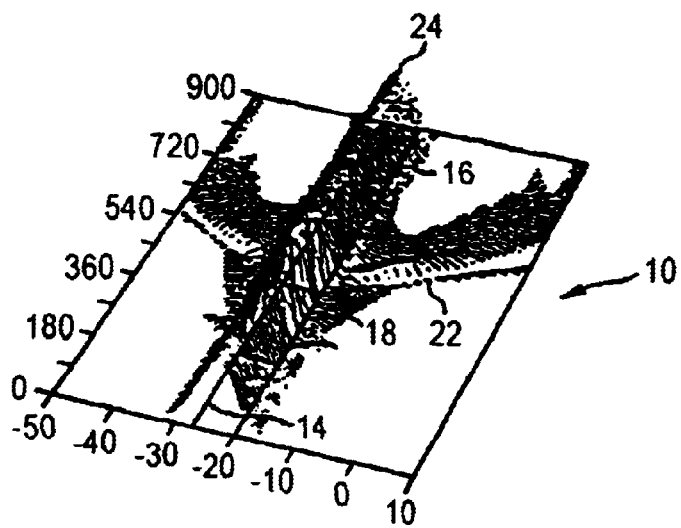
FIGS. 2A to 2C show the thermo-optical attenuator shown in FIG. 1 in three operating modes.
Figure 2B:
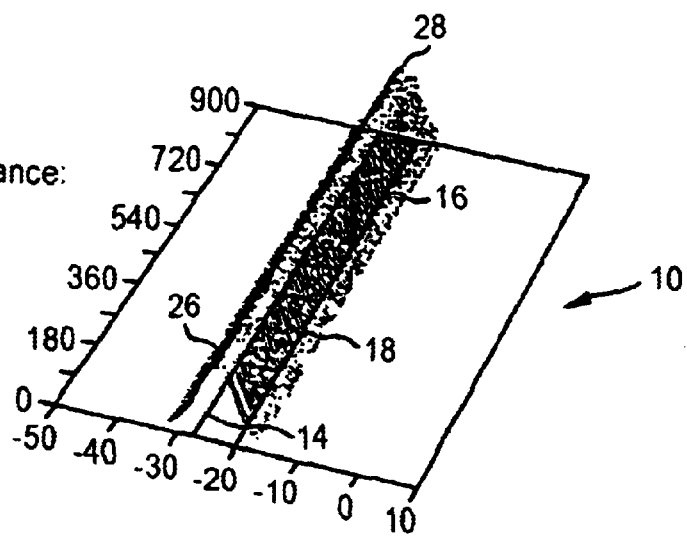
Figure 2C:
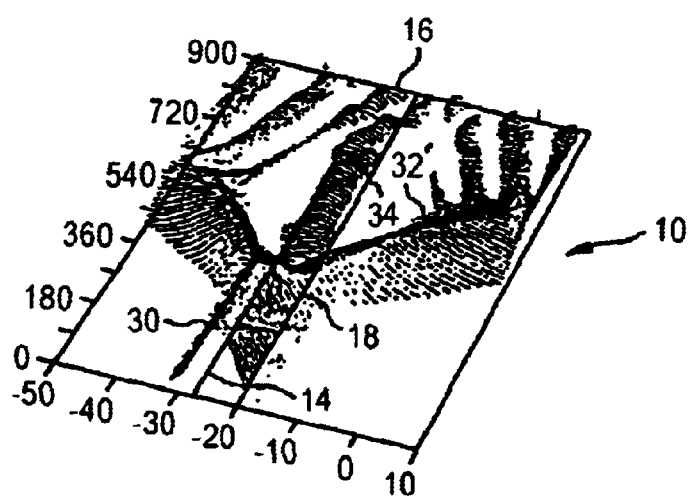

FIGS. 2A, 2B and 2C show the attenuator 10 in three operating modes Ia, IIa and IIIa. In all three operating modes Ia, IIa, IIIa, a wave is introduced into the waveguide core 14. This wave propagates in the direction toward the polymer region 18. In FIGS. 2A, 2B and 2C, intensity distributions are in each case illustrated in a plane which lies parallel to the substrate and in the center of the waveguide cores 14, 16. The intensity results from the sum of the squares of the components of the electric field strength.

FIG. 2A shows the operating mode Ia, in which the polymer region has not yet been heated and is at a temperature T1a. In operating mode Ia, the refractive index $n2$ of the polymer region 18 is higher than the refractive index $n3$ and therefore also higher than the refractive index $n1$. The refractive index $n2$ of the polymer region 18 is therefore higher than that of the material surrounding the polymer region 18, which has the refractive index $n1$. The polymer region 18 is therefore able to transmit a wave which is introduced as input wave 20. However, since the refractive index $n2$ of the polymer region 18 differs from the refractive index $n3$ of the waveguide core 14 or of the waveguide core 16, the boundaries between the polymer region 18 and the waveguide core 14 or the waveguide core 16 form dislocations which lead to transmission losses. Therefore, a scattered wave 22 of low intensity compared to the input wave 20 arriving from the waveguide core 14 is radiated into the waveguide layer 12. However, most of the input wave is transmitted through the polymer region 18 and is passed on as output wave 24 with the aid of the waveguide core 16.

Operating mode Ia is in practice used as an intermediate stage between operating modes IIa and IIIa which are explained with reference to FIGS. 2B and 2C.

FIG. 2B shows the attenuator 10 in operating mode IIa. The temperature T2a of the polymer region 18 in operating mode IIa is higher than temperature T1a. Therefore, in operating mode IIa the refractive index n2 of the polymer region 18 is equal to the refractive index n3 of the waveguide core 14 and of the waveguide core 16. This means that the polymer region 18 is matched to the waveguide core 14 and the waveguide core 16. An input wave 26 is introduced into the waveguide core 14 and is transmitted virtually without losses via the polymer region 18 to the waveguide core 16, appearing as output wave 28 at the output of the attenuator 10.

In operating mode IIa, therefore, the thermo-optical attenuator works as a waveguide which transmits virtually without losses.

FIG. 2C shows the thermo-optical attenuator 10 in an operating mode IIIa, in which the polymer region 18 has been heated to an even greater extent than in operating mode IIa. The temperature T3a of the polymer region 18 is higher than the temperature T2a. Consequently, the refractive index n2 of the polymer region 18 is lower than the refractive index n1 and therefore also lower than the refractive index n3. Since the refractive index n2 of the polymer region 18 is lower than the refractive index n1 of the surrounding medium, in operating mode IIIa the polymer region 18 cannot act as a waveguide. An input wave 30 which is introduced at the input of the attenuator 10 is almost completely radiated into the surrounding medium at the interface between waveguide core 14 and polymer region 18, and in this surrounding medium propagates as a scattered wave 32 of high intensity. Only a residual wave 34 which has been greatly attenuated compared to the input wave 30 and to the scattered wave 32 and which emerges at the output of the attenuator 10 passes into the waveguide core 16.

In operating mode IIIa, the attenuator 10 has its greatest influence on the incoming wave. By way of example, if a sensor element is situated at the output of the attenuator 10, in operating mode IIIa the lowest amount of energy reaches the sensor element.

Figure 3:
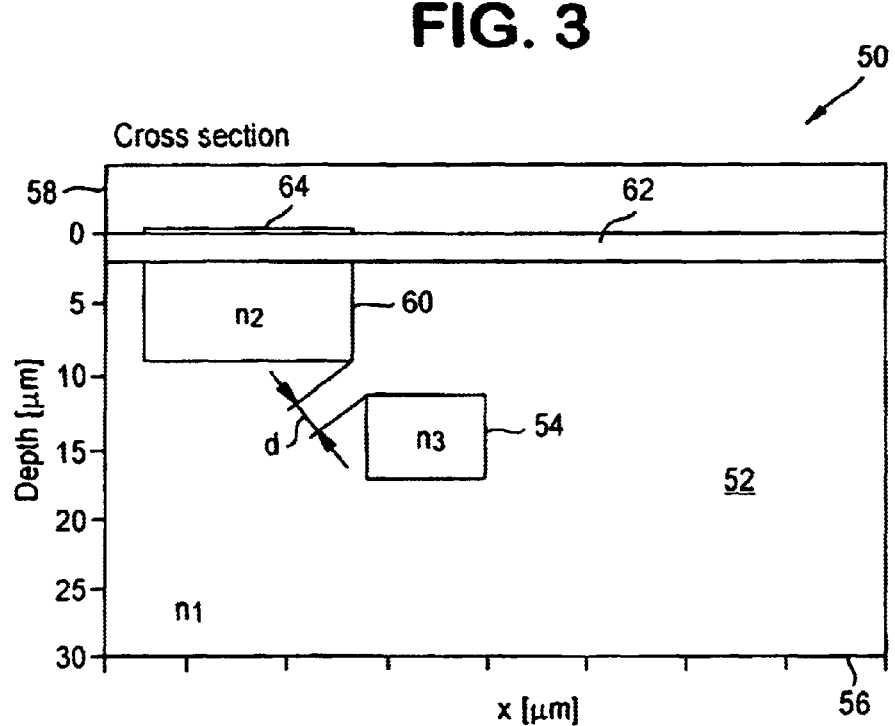
FIG. 3 shows the cross section through a thermo-optical attenuator with curved waveguide.

FIG. 3 shows a cross section through a thermo-optical attenuator 50 which, in a waveguide layer 52, includes a waveguide core 54 which curves along the propagation direction of the waves, cf. FIGS. 4A and 4B. The waveguide layer 52 consists of silicon dioxide with a refractive index n1 of 1.447. The waveguide core 54 likewise consists of silicon dioxide, but has a refractive index n3 of 1.45. The waveguide core 54 is rectangular in cross section and its dimensions are such that a light wave with a wavelength of 1550 nanometers (nm) is transmitted virtually without losses.

To illustrate the dimensions of the attenuator 50, an abscissa axis 56 shows length values in the horizontally running x direction. An ordinate axis 58 shows length values in the y direction, which is perpendicular to the x direction. Length values in $\mu$m are plotted on the abscissa axis 56 and the ordinate axis 58. In the x direction, the extent of the waveguide core 52 is approximately 6 $\mu$m, and in the y direction the extent of the waveguide core 52 is approximately 6 $\mu$m.

A polymer region 60 which is rectangular in cross section is offset in both the x direction and the y direction with respect to the waveguide core 54. The polymer region 60 runs parallel to a section of the waveguide core 54 in the propagation direction of the waves, cf. FIGS. 4A and 4B. In the y direction, the polymer region 60 is situated further away from a substrate (not shown) than the waveguide core 54. A distance d between the top left-hand edge of the waveguide core 54 and the bottom right-hand edge of the polymer region 60 is only a few $\mu$m, for example 2 $\mu$m. Since the wave is transmitted both in the waveguide core 54 and in the regions which immediately adjoin this waveguide core 54, its propagation can be influenced by the polymer region 60.

The polymer region 60 consists of CYCLOTENE™ and at room temperature, i.e. at 20° C., has a refractive index n2 of approximately 1.5.

The polymer region 60 adjoins a polymer layer 62 which lies on the surface of the waveguide layer 52. On the polymer layer 62, in the region of the polymer region 60, there is an electrode 64 which is designed as a heater element.

Depending on the temperature in the polymer region 60 which is generated by the electrode 64, the attenuator 50 operates in one of two operating modes Ib and IIb, which are explained below with reference to FIGS. 4A and 4B.

FIGS. 4A and 4B show the thermo-optical attenuator 50 in two operating modes Ib and IIb. A plan view of a plane through the attenuator 50 which lies parallel to the substrate surface is shown in FIGS. 4A and 4B. The figures also illustrate the intensity distribution within the attenuator 50, resulting from an input wave which has been introduced at an input 66 of the attenuator 50, in the different operating modes Ib and IIb. Moreover, FIGS. 4A and 4B each show an abscissa axis 68 and an ordinate axis 70, on which length details are plotted using the unit $\mu$m. By way of example, the polymer region 60 has a length of approximately 500 $\mu$m in the z direction.

The waveguide core 54 is curved twice as it runs from the input 66 to an output 72 of the attenuator 50. The first curve runs to the right and lies in the region of the polymer region 60. Then, the waveguide core 54 is curved to the left. In the region of this curve, there is a further polymer region 74, which likewise consists of a polymer of refractive index n2. The polymer regions 60 and 74 each lie on the convex side in the curved profile of the waveguide core 54.

An electrode (not shown) for presetting the temperature in the polymer region 74 is also situated above the polymer region 74.

FIG. 4A shows the attenuator 50 in operating mode Ib. In operating mode Ib, no voltage is applied to the electrode 64 and the electrode arranged above the polymer region 74. Therefore, the electrodes are not providing any heat. T1b denotes the temperature in the polymer regions 60 and 74. In operating mode Ib, the refractive index n2 of the polymer regions 60 and 74 is higher than the refractive index n1 and the refractive index n3. Therefore, the polymer regions 60 and 74 can act as waveguides. An input wave 76 which is introduced at the input 66 is drawn almost completely into the polymer layer 60, where it propagates. Scattered waves 78 occur at the edges of the polymer region 60 and propagate diffusely in the waveguide layer 12. Only a wave of low intensity emerges at the output 72.

The polymer region 74 further attenuates a residual wave transmitted in the waveguide core 54.

Operating mode Ib is used, by way of example, if a sensor element arranged at the output 72 is to be in the at-rest state.

FIG. 4B shows the attenuator 50 in operating mode IIb. In operating mode IIb, the electrode 64, cf. FIG. 3, and the electrode arranged above the polymer region 74 are carrying voltage and heat the polymer regions 60 and 74 to a temperature T2b which lies above the temperature T1b of operating mode Ib. Consequently, the value of the refractive index n2 falls compared to the operating mode Ib. In operating mode IIb, the refractive index n2 is lower than the refractive index n1 of the waveguide layer 52 and therefore also lower than the refractive index n3. Since the refractive index n2 of the polymer regions 60 and 74 is less than or equal to the refractive index of the surrounding medium of the waveguide layer 52, the polymer regions 60 and 74 cannot operate as waveguides. An input wave 80 which is introduced at the input 66 is transmitted along the waveguide core 54 substantially without interference to the output 72, where it appears as output wave 82.

Therefore, in the switched-on state, i.e. in operating mode IIb, the attenuator 50 transmits the input wave 80. In operating mode Ib, i.e. in the switched-off state of the attenuator 50, by contrast, an input wave 76 is radiated into the waveguide layer 52. In this way, the attenuator 50 can also be used as a switch.

Figure 5:
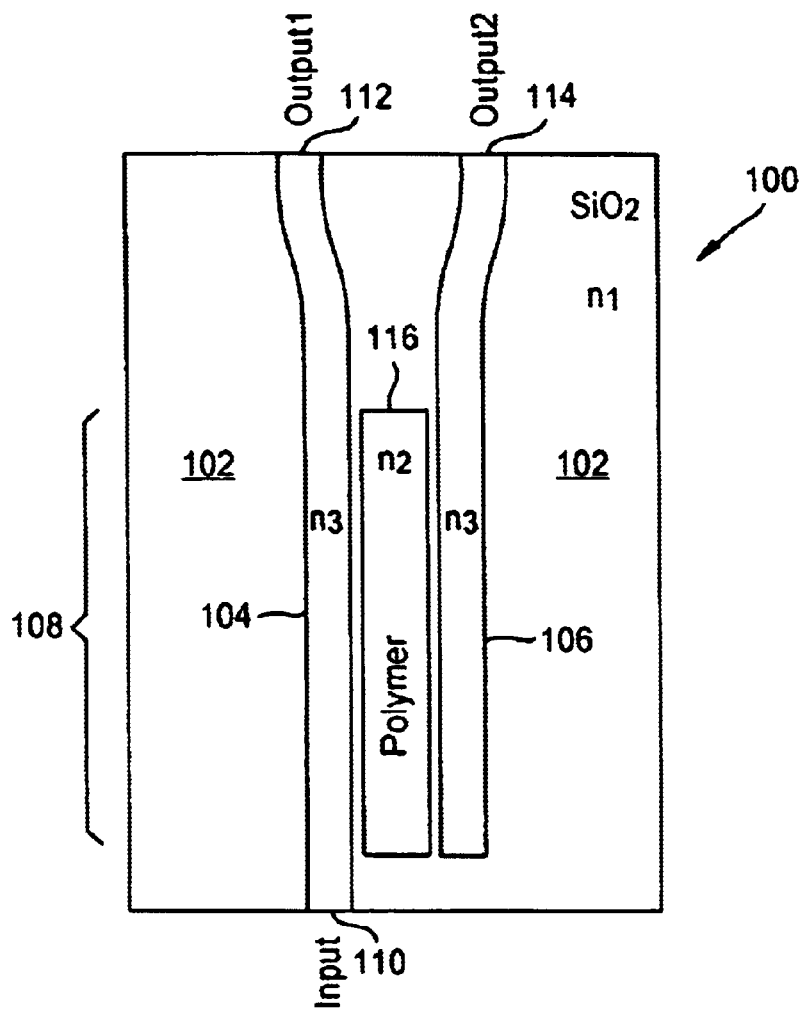
FIG. 5 shows a plan view of a thermo-optical reversing switch.

FIG. 5 shows a plan view of a thermo-optical reversing switch 100, which in a waveguide layer 102 includes two waveguide cores 104 and 106 which run parallel to one another in a region 108. The waveguide layer 102 consists of silicon dioxide with a refractive index n1 of 1.442. The waveguide cores 104 and 106 likewise consist of silicon dioxide but have a refractive index n3 of 1.448. The waveguide core 104 runs from an input 110 to a working output 112. The waveguide core 106 runs from the section 108 to a neutral output 114.

In the region of the section 108, there is a polymer region 116 made from CYCLOTENE™, which at room temperature (20° C.) has a refractive index n2 of 1.5, is located between the waveguide cores 104 and 106. The polymer region 116 extends on the one hand parallel to the waveguide cores 104 and 106. On the other hand, the polymer region 116 extends from the surface of the waveguide layer 102 to a depth to which the waveguide cores 104 and 106 also reach. However, unlike the polymer region 116, the waveguide cores 104 and 106 are completely surrounded by the silicon dioxide of the waveguide layer with the refractive index n1.

Figure 6A:
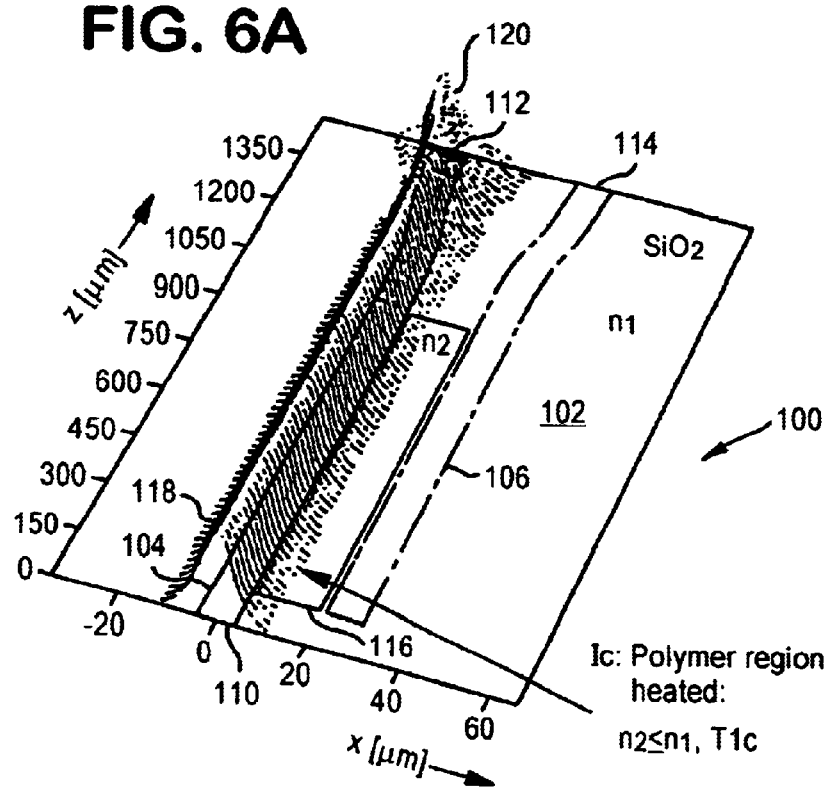
FIGS. 6A and 6B show the thermo-optical reversing switch shown in FIG. 5 in two operating modes.
Figure 6B:
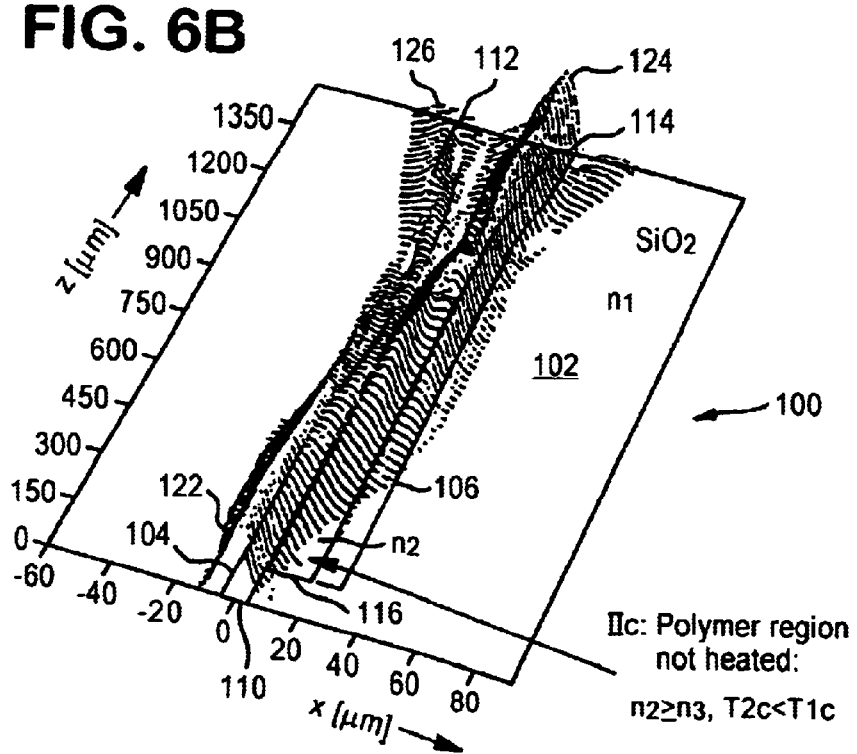

FIGS. 6A and 6B show two operating modes Ic and IIc of the thermo-optical reversing switch 100. The figures illustrate the intensity distribution of the electrical component of an electromagnetic wave in a plane laid through the center axes of the waveguides 104 and 106. In the longitudinal direction of the waveguide cores 112 and 114, length details are given in micrometers on the left-hand side of the plane. The excerpt shown lies at z positions from 0 micrometers to approximately 1350 micrometers. Length details in the x direction in micrometers are shown at the lower edge of the plane. The center axis of the waveguide core 112 lies at 0 micrometers. The planes shown in FIGS. 6A and 6B extend from approximately −40 micrometers to approximately 60 micrometers in the x direction.

FIG. 6A shows the operating mode Ic, in which the polymer region 116 is being heated by the electrodes (not shown) at a temperature T1c. At temperature T1c, the refractive index n2 of the polymer region 116 is less than or equal to the refractive index n1 of the polymer layer 102 surrounding the polymer region 116 and the waveguide cores 112 and 114. On account of its low refractive index n2, the polymer region 116 cannot function as a waveguide. An input wave 118 which is introduced at the input 110 of the reversing switch 100 is transmitted virtually unchanged through the waveguide core 112 to the working output 112, where it appears as output wave 120. In operating mode Ic, there is no wave at the neutral output 114.

FIG. 6B shows the thermo-optical reversing switch 100 in operating mode IIc, in which the polymer region 116 is not being heated, i.e. the reversing switch 100 is in the neutral state. In operating mode IIc, the reversing switch 100 works at a temperature T2c which is lower than temperature T1c. On account of the negative thermo-optical coefficient of the polymer region 116, the refractive index n2 at temperature T2c is higher than at temperature T1c. In operating mode IIc, the refractive index n2 of the polymer region 110 is higher than the refractive index n3 of the waveguide cores 112 and 114 and therefore also higher than the refractive index n1 of the waveguide layer 102. On account of this relationship between the refractive indices, the polymer region 116 is able to influence a wave which is propagating in the waveguide core 112. The polymer region 116 operates as a coupling region between the waveguide cores 112 and 114. In the region of the polymer region 116, an input wave 122 at the input 110 is transferred into the waveguide core 114, and appears at the neutral output 114 as output wave 124. In operating mode IIc, only a small part of the input wave 122 appears as residual wave 126 at the working output 112. The intensity of the residual wave 126 is lower by orders of magnitude than the intensity of the output wave 124.

Figure 7A:
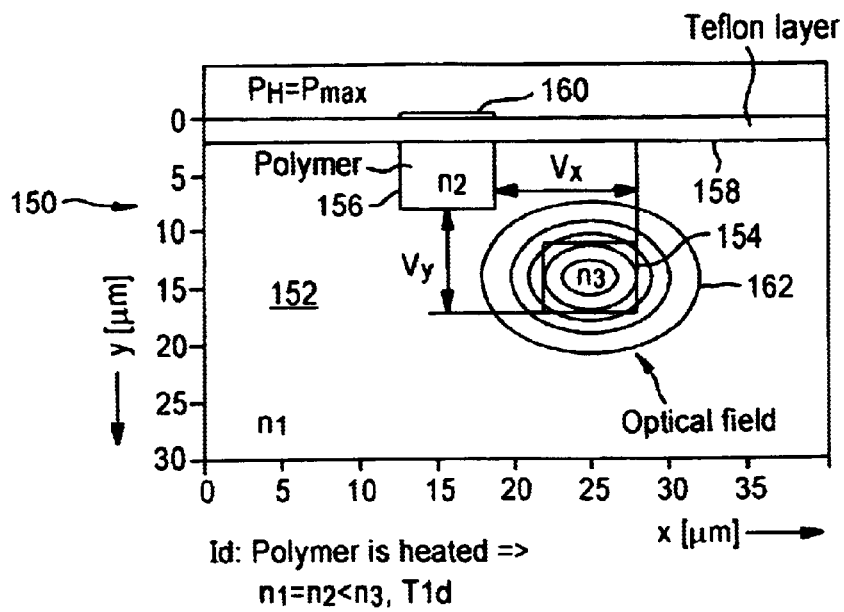
FIGS. 7A, 7B and 7C illustrate cross sections through a thermo-optical switch in three operating modes.
Figure 7B:
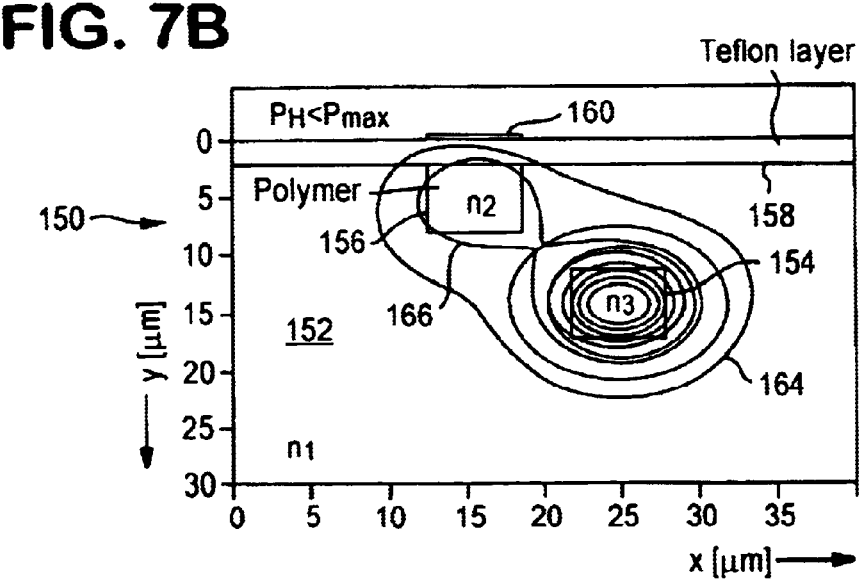
Figure 7C:
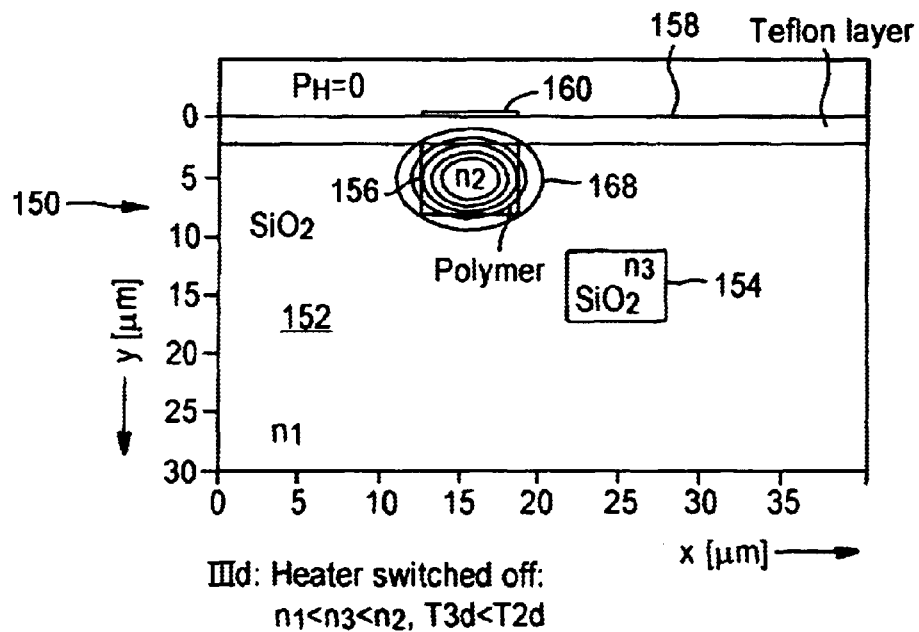

FIGS. 7A, 7B and 7C show cross sections through a thermo-optical attenuator 150. The attenuator 150 includes, on a silicon substrate (not shown), a waveguide layer 152 made from silicon dioxide with a refractive index n1 of 1.442 at room temperature, i.e. at 20° C. A waveguide core 154, which has a square cross section, illustrated in distorted form, and likewise consists of silicon dioxide, but with a refractive index n3 of 1.448, is embedded in the waveguide layer 152. A trench which ran parallel to the waveguide core 154 was etched into the waveguide layer 154. The trench was then filled with the polymer CYCLOTENE™, so that a polymer region 156 is formed. In the direction which runs transversely with respect to the propagation direction of waves, the polymer region 156 has the same cross-section as the waveguide core 154. At room temperature, i.e. at 20° C., the polymer region 156 has a refractive index n2 of 1.5. However, the polymer region 156 only runs next to the waveguide core 154 for a relatively short section, for example for a distance of 500 micrometers. A thin layer of TEFLON™, a durable and slippery polymer manufactured by E.I. du Pont de Nemours and Company, 158 with a height of approximately 2 micrometers is applied above the polymer region 156 and above the waveguide layer 152. The TEFLON™ layer 158 ahs a refractive index which approximately corresponds to the refractive index n1. As a result, the TEFLON™ layer 158 has a refractive index which approximately corresponds to the refractive index n1. As a result, the TEFLON™ layer 158 prevents waves from the polymer region 156 from reaching a heating electrode 160 which is arranged above the polymer region 156 on the TEFLON™ layer 158.

In FIGS. 7A, 7B and 7C, length details are plotted in micrometers in the vertical x direction and in the vertical y direction. The surface of the TEFLON™ layer 158 lies at 0 micrometers in the y direction. The waveguide core 154 and the polymer region 156 each have an extent of approximately 6 micrometers in the x direction and also have an extent of approximately 6 micrometers in the y direction. In the x direction, the polymer region 156 is offset by an offset Vx of approximately 9 micrometers (from center to center). In the y direction, there is likewise an offset Vy of approximately 9 micrometers. Therefore, the shortest distance between waveguide core 154 and polymer region 156 is only a few micrometers. This means that the propagation of a wave in the waveguide core 154 and in the region of the waveguide layer 152 which lies directly around the waveguide core 154 can be influenced with the aid of the polymer region 156.

In an operating mode Id, the attenuator 150 is heated, with the aid of the heating electrode 160, by supplying a maximum heating power Pmax, to a temperature T1d. At this temperature, the refractive index n2 of the polymer region is equal to the refractive index n1, i.e. 1.442, i.e. the same as the refractive index of the waveguide layer 52 which surrounds the polymer region 156. Therefore, in operating mode Id, the polymer region 156 cannot act as a waveguide. A wave which is introduced into the waveguide core 154 propagates without obstacle and is not influenced by the polymer region 156. Equi-intensity lines of a wave of this type are also shown in FIG. 7A, for example the equi-intensity line 162.

FIG. 7B shows the thermo-optical attenuator 150 in an operating mode IId. In this operating mode IId, the heating electrode 160 is supplied with a heating power PH which is lower than the maximum heating power Pmax of the heating electrode 160. Consequently, in operating mode IId the temperature T2d of the polymer region 156 is lower than temperature T1d. On account of the changed temperature, in operating mode IId the refractive index n2 of the polymer region 156 is higher than the refractive index n1 of the waveguide layer 152 surrounding the polymer region 156. In operating mode IId, the refractive index n2 is equal to the refractive index n3 of the waveguide core 154. This leads to the polymer region 156 "sucking out" a part of the wave which is propagating in the waveguide core 156. Equi-intensity lines 164 and 166 comprise both the waveguide core 154 and the polymer region 156. This "sucking out" attenuates the intensity of a wave which is propagating in the waveguide core 154.

FIG. 7C shows the thermo-optical attenuator 150 in an operating mode IIId in which the heating electrode 160 is in the voltage-free state. The heating power PH is 0 watts. The temperature T3b of the polymer region 156 is lower than temperature T2d. Consequently, the refractive index n2 of the polymer region 156 is higher than the refractive index n3 of the waveguide core 154 and is also higher than the refractive index n1 of the waveguide layer 152, which also surrounds the polymer region 156. Therefore, in operating mode IIId, the polymer region 156 is better able to carry a wave than the waveguide core 154. The cross section shown in FIG. 7C lies at the end of the polymer region 152 which is reached by a wave entering the attenuator 150 later than the other end of the polymer region 156. A wave which propagates in the waveguide core, up to the cross section illustrated in FIG. 7C, is introduced in its entirety from the waveguide core 154 into the polymer region 156. Therefore, equi-intensity lines 168 encompass only the polymer region 156.

The attenuator 150 illustrated in FIGS. 7A, 7B and 7C can therefore be used, by way of example, as a switch. In operating mode Id, a wave passes through the attenuator 150 without being influenced. By contrast, in operating mode IIId the "switch" is open and an incoming wave cannot pass through the waveguide region 154, since it is transferred into the polymer region 168.

If the attenuator 150 is used for signal matching, all three operating modes Id, IId and IIId are utilized. A sensor element is situated, by way of example, at the output of the waveguide core 154. In operating mode Id, a wave which enters the waveguide core is transferred without obstacle to the sensor element. In operating mode IId, only a part of the wave which is introduced into the waveguide core 154 reaches the sensor element. In operating mode IIId, by contrast, a wave which propagates in the waveguide core 154 cannot reach the sensor element.

Figure 8A:
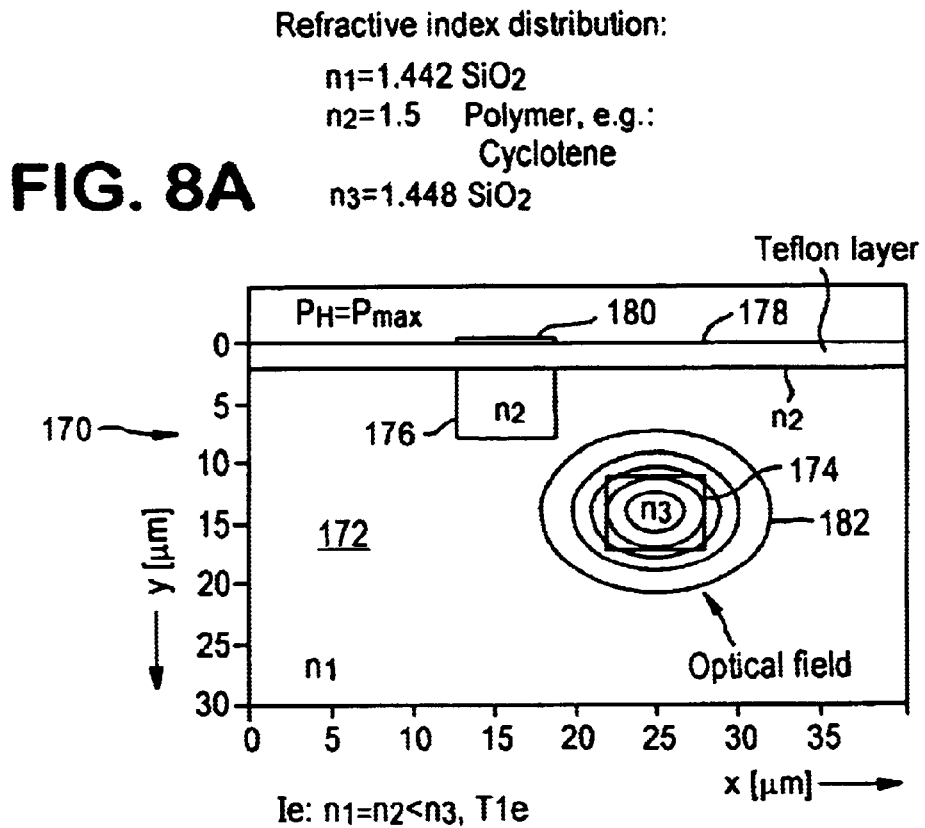
FIGS. 8A, 8B and 8C illustrate cross sections through a thermo-optical absorber in three operating modes.
Figure 8B:
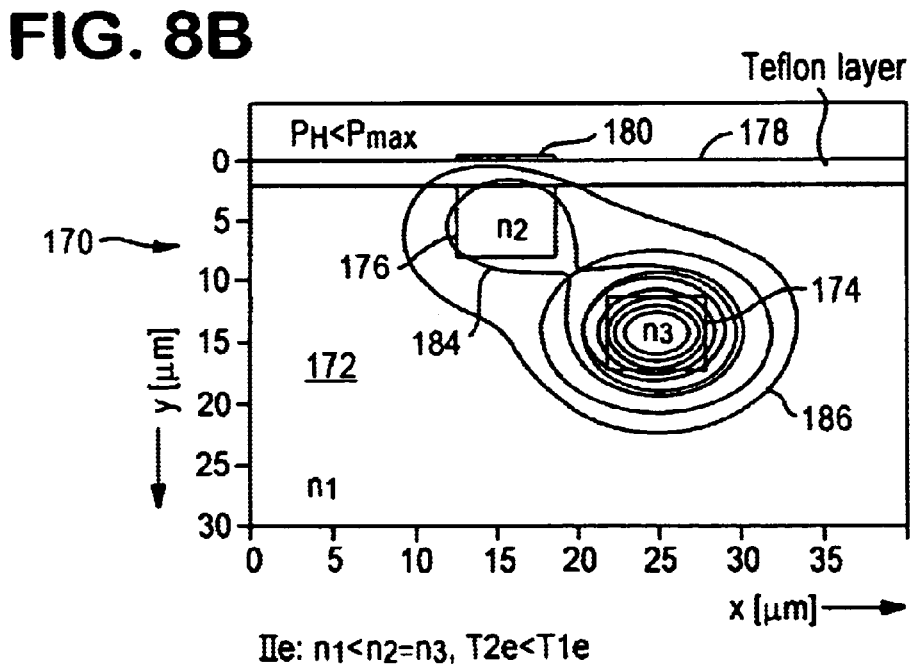
Figure 8C:
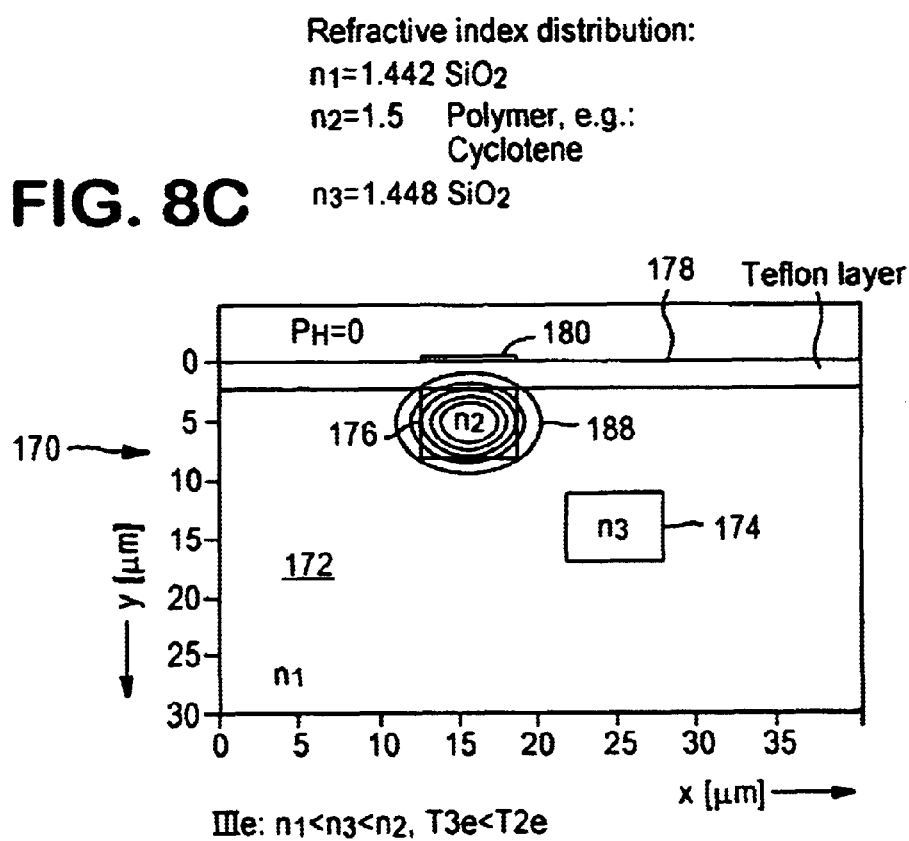

FIGS. 8A, 8B and 8C show cross sections through a thermo-optical absorber 170. On a silicon substrate (not shown), there is a waveguide layer 172 made from silicon dioxide with a refractive index n1 of 1.442 at 20° C. A waveguide core 174 has been embedded in the waveguide layer 172 with the aid of the process steps described in the introduction. The waveguide core 174 likewise consists of silicon dioxide, but has a refractive index n3 of 1.448. The waveguide core 174 has a square cross section which, however, appears rectangular on account of the distorted illustration in FIGS. 8A, 8B and 8C. A polymer region 176 was introduced into the waveguide layer 172 in the immediate vicinity of the waveguide core 174. To do this, firstly a trench was etched parallel to the path of the waveguide core 176, over a length of approximately 300 micrometers. Then, a spinning process was used to introduce a polymer, for example CYCLOTENE™, into the trench. The result was the formation of a polymer layer 178 on the surface of the waveguide layer 172. The polymer region 176 and the polymer layer 178 have a refractive index n2 of 1.5 at room temperature of 20° C.

In FIGS. 8A, 8B and 8C, details of dimensions for the horizontal x direction and the vertical y direction in micrometers are plotted at the lower edge and at the left-hand edge, respectively. The waveguide core 174 and the polymer region 176 have a square cross section of 6 micrometers by 6 micrometers. The polymer region 176 is offset by in each case 9 micrometers in the x direction and in the y direction (center to center) with respect to the waveguide core 174. Therefore, the polymer region 176 is situated so close to the waveguide core 174 that a wave which is transmitted with the aid of the waveguide core 174 can be influenced depending on the refractive index n2 of the polymer region 176.

FIG. 8A shows an operating mode Ie of the thermo-optical absorber 170, in which a heating electrode 180 is being operated with a maximum heating power Pmax. The heating electrode 180 is located directly above the polymer region 176 on the polymer layer 178. In operating mode Ie, the polymer region 176 is heated at a temperature T1e. At this temperature, the polymer region 176 has a refractive index n2 which is equal to the refractive index n1. Therefore, the polymer region n2 cannot act as a waveguide in operating mode Ie. In operating mode Ie, a wave which is introduced into the waveguide core 174 is guided past the polymer region 176 without being influenced by the latter. Therefore, equi-intensity lines 182 encompass only the waveguide core 174.

FIG. 8B shows an operating mode IIe in which the electrode 180 is operated with a heating power PH which is lower than the maximum heating power Pmax. Therefore, a temperature T2e of the polymer region 176 in operating mode IIe is lower than temperature T1e. On account of the lower temperature T2e, a refractive index n2 which is equal to the refractive index n3 and therefore also greater than the refractive index n1 is established in the polymer region 176.

On account of these refractive indices, the polymer region 176 is able to guide a wave and extracts a part of a wave which is being transported with the aid of the waveguide core 164, cf. equi-intensity line 184 and 186, encompassing both the polymer region 176 and the waveguide core 174. However, the wave which is guided in the polymer region 176 is absorbed by the heating electrode 180. The absorption of the wave with the aid of the heating electrode 180 leads to less energy being radiated into the waveguide layer 172 than with the thermo-optical attenuator 150 which was explained with reference to FIGS. 7A, 7B and 7C.

FIG. 8C shows an operating mode IIIe in which the heating electrode 180 is free of voltage and is therefore switched off. The heating power PH is therefore 0 watts. In operating mode IIIe, T3e denotes the temperature in the polymer region 176. Temperature T3e is lower than temperature T2e in operating mode IIe. On account of the lower temperature T3e, in operating mode IIIe the refractive index n2 of the polymer region 176 is higher than the refractive index n3 in the waveguide core 174 and is also higher than the refractive index n1 of the waveguide layer 172. On account of these refractive indices, the polymer region 176 is more suitable for transporting a light wave of, for example, 1550 nanometers than the waveguide core 174. If a wave is introduced into the waveguide core 174 at the input of the absorber 170, in the cross section at the end of the polymer region 176, which is shown in FIG. 8c, this wave has been almost completely transferred into the polymer region 176, cf. equi-intensity lines 188 which encompass only the polymer region 176. The wave which is being guided in the polymer region 176 is almost completely absorbed by the heating electrode 180. The radiation into the waveguide layer 172 is low.

In other exemplary embodiments of the components which have been explained with reference to FIGS. 3, 4A, 4B; 7A, 7B, 7C; 8A, 8B and 8C, polymers which strongly attenuate waves are used in the polymer region 60, 74, 156, 176. Consequently, the attenuation which is achieved with the components is increased further.

In other exemplary embodiments, polymers with other properties, for example with a positive thermo-optical coefficient, are used. In this way, it is possible to reverse the switching behavior in the neutral state and in the operating state of the component in question.

LIST OF REFERENCE SYMBOLS

10 Thermo-optical attenuator
12 Waveguide layer
14, 16 Waveguide core
n1, n2, n3 Refractive index
18 Polymer region
Ia, IIa, IIIa Operating mode
T1a, T2a, T3a Temperature
19a Abscissa axis
19b Ordinate axis
20 Input wave
22 Scattered wave
24 Output wave
26 Input wave
28 Output wave
30 Input wave
32 Scattered wave
34 Residual wave
50 Thermo-optical attenuator
52 Waveguide layer
54 Waveguide core
56 Abscissa axis
58 Ordinate axis
60 Polymer region
d Distance
62 Polymer layer
64 Electrode
Ib, IIb Operating mode
T1b, T2b Temperature
66 Input
68 Abscissa axis
70 Ordinate axis
72 Output
74 Polymer region
76 Input wave
78 Scattered wave
80 Input wave
82 Output wave
100 Thermo-optical reversing switch
102 Waveguide layer
104, 106 Waveguide core
108 Section
110 Input
112 Working output
114 Neutral output
116 Polymer region
Ic, IIc Operating mode
T1c, T2c Temperature
118 Input wave
120 Output wave
122 Input wave
124 Output wave
126 Residual wave
Id, IId, IIId Operating mode
T1d, T2d, T3d Temperature
150 Thermo-optical attenuator
152 Waveguide layer
154 Waveguide core
156 Polymer region
158 Teflon layer
160 Heating electrode
Vx, Vy Offset
162 Equi-intensity lines
PH Heating power
Pmax Maximum heating power
164, 166, 168 Equi-intensity lines
170 Thermo-optical absorber
Ie, IIe, IIIe Operating mode
T1e, T2e, T3e Temperature
172 Waveguide layer
174 Waveguide core
178 Polymer layer
180 Heating electrode
182 to 188 Equi-intensity lines

What is claimed is:

1. An integrated waveguide arrangement, comprising:
   (a) a waveguide region which consists of glass forming a waveguide sheath in which a waveguide with glass core is arranged;
   (b) a foreign region which extends in the vicinity of the waveguide and is made from a material other than glass, wherein the foreign region is a material with a thermo-optical coefficient whose magnitude is significantly greater than the magnitude of the thermo-optical coefficient of the glass; and (c) a temperature-adjustment unit for heating and/or cooling the foreign region, so that it is possible to influence the wave propagation in the waveguide,
wherein, the foreign region is integrated in the waveguide region.

2. The waveguide arrangement as claimed in claim 1, wherein the waveguide region is arranged on a planar substrate,
and wherein the waveguide region, on the side remote from the substrate, forms a surface which lies approximately parallel to the interface of substrate and waveguide region.

3. The waveguide arrangement as claimed in claim 1, wherein the foreign region contains a polymer, preferably a fluoroacrylate polymer or a benzocyclobutene-based polymer.

4. The waveguide arrangement as claimed in claim 3, wherein the foreign region extends from that surface of the waveguide region which is remote from the substrate to close to the waveguide.

5. The waveguide arrangement as claimed in claim 1, wherein the waveguide core has a greater refractive index (n3) than the waveguide sheath, and wherein the refractive index of the material in the foreign region is less than, equal to or greater than the refractive index of the waveguide sheath, depending on the temperature which is generated by the temperature adjustment unit.

6. The waveguide arrangement as claimed in claim 1, wherein the foreign region extends into the waveguide core, and wherein, depending on the temperature in the foreign region, a wave is transmitted from that part of the waveguide which lies on one side of the foreign region into that part of the waveguide which lies on the other side of the foreign region.

7. The waveguide arrangement as claimed in claim 1, wherein the foreign region extends approximately parallel to the waveguide.

8. The waveguide arrangement as claimed in claim 7, wherein the waveguide is arranged outside a region which lies between foreign region and a substrate for supporting the waveguide region.

9. The waveguide arrangement as claimed in claim 7, wherein the waveguide is curved along the propagation direction of the waves,
and wherein the foreign region is arranged at the curved region of the waveguide.

10. The waveguide arrangement as claimed in claim 7, wherein the waveguide and the foreign region have approximately the same cross section.

11. The waveguide arrangement as claimed in claim 1, wherein the waveguide region contains two waveguides which run approximately parallel and between which the foreign region is arranged.

12. The waveguide arrangement as claimed in claim 1, wherein an intermediate layer of a material which prevents a wave which is propagating in the foreign region from reaching the temperature-adjustment unit is arranged between temperature-adjustment unit and foreign region.

13. The waveguide arrangement as claimed in claim 1, wherein the temperature adjustment unit bears directly against the foreign region.

14. A process for producing an integrated waveguide arrangement,
(a) in which a base layer of glass is applied to a substrate;
(b) a core layer of glass with a higher refractive index than the glass of the base layer is applied to the base layer;
(c) regions which lie around the core of a waveguide are removed from the core layer;

(d) then a covering layer of glass is applied to the base layer and/or core layer, the refractive index of which corresponds to the refractive index of the base layer;
(e) regions are removed from the covering layer near to the waveguide core;
(f) a foreign material which is different from glass is introduced into the exposed regions of the covering layer; and
(g) in which a temperature-adjustment unit for heating and/or cooling is arranged in the vicinity of the region which has been filled with foreign material.

15. A thermo-optical radiation unit, comprising:
(a) a waveguide which includes a glass core and glass forming a sheath;
(b) a foreign region which extends in the vicinity of the waveguide and is made from a material other than glass, wherein the foreign region is a material with a thermo-optical coefficient whose magnitude is significantly greater than the magnitude of the thermo-optical coefficient of the glass; and
(c) a temperature-adjustment unit for heating and/or cooling the foreign region, with the result that the wave propagation in the waveguide is influenced,
wherein the foreign region extends into the waveguide core,
and wherein, depending on the temperature in the foreign region, a wave is transmitted from that part of the waveguide which lies on one side of the foreign region into that part of the waveguide which lies on the other side of the foreign region.

16. A thermo-optical switching unit, comprising:
at least two waveguides, which each comprise a glass core and glass forming a sheath and which run approximately parallel to one another
a foreign region which extends in the vicinity of the waveguides and is made from a material other than glass, wherein the foreign region is a material with a thermo-optical coefficient whose magnitude is significantly greater than the magnitude of the thermo-optical coefficient of the glass; and
a temperature-adjustment unit for heating and/or cooling the foreign region, with the result that the wave propagation in the waveguide is influenced,
wherein the foreign region extends approximately parallel to the waveguides and is arranged between the waveguides.

17. A thermo-optical absorption unit,
(a) having a waveguide which includes a glass core and glass forming a sheath;
(b) a foreign region which extends in the vicinity of the waveguide and is made from a material other than glass; and
(c) having a temperature-adjustment unit for heating and/or cooling the foreign region, with the result that the wave propagation in the waveguide is influenced,
wherein the temperature-adjustment unit bears directly against the foreign region, and wherein the temperature-adjustment unit heats and/or cools the foreign region and absorbs waves propagating from the foreign region.

18. An integrated waveguide arrangement, comprising:
(a) a waveguide region which consists of glass forming a waveguide sheath in which a waveguide with glass core is arranged;

(b) a foreign region which extends in the vicinity of the waveguide and is made from a material other than glass, wherein the foreign region is a material with a thermo-optical coefficient whose magnitude is significantly greater than the magnitude of the thermo-optical coefficient of the glass, and which in terms of magnitude is preferably significantly greater than the thermo-optical coefficient whose magnitude is significantly greater than the magnitude of the thermo-optical coefficient of the glass, in particular more than eighty times greater; and (c) a temperature-adjustment unit for heating and/or cooling the foreign region, so that it is possible to influence the wave propagation in the waveguide, wherein the foreign region is integrated in the waveguide region.

* * * * *